(12) United States Patent
Tomiji et al.

(10) Patent No.: US 7,377,500 B2
(45) Date of Patent: May 27, 2008

(54) SHOCK ABSORBING DEVICE FOR MOVING BODY

(75) Inventors: Katsuyasu Tomiji, Kamakura (JP); Takefumi Tsuchiya, Zushi (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 110 days.

(21) Appl. No.: 11/180,576

(22) Filed: Jul. 14, 2005

(65) Prior Publication Data

US 2005/0269176 A1 Dec. 8, 2005

Related U.S. Application Data

(63) Continuation-in-part of application No. 11/009,043, filed on Dec. 13, 2004.

(30) Foreign Application Priority Data

| Dec. 26, 2003 | (JP) | ............................. 2003-433572 |
| Jul. 21, 2004 | (JP) | ............................. 2004-213528 |

(51) Int. Cl.
 *F16F 9/50* (2006.01)
(52) U.S. Cl. .................. 267/64.15; 267/34; 16/49; 16/51
(58) Field of Classification Search ............... 188/280, 188/300; 267/64.12, 64.15, 34, 120, 195, 267/217, 221; 16/49, 51
See application file for complete search history.

(56) References Cited

U.S. PATENT DOCUMENTS

| 2,252,771 | A | * | 8/1941 | Katcher | ...................... 188/280 |
| 2,953,811 | A | * | 9/1960 | Hall | ............................... 16/66 |
| 3,863,947 | A | * | 2/1975 | Weston | ......................... 280/90 |
| 3,896,908 | A | * | 7/1975 | Petrak | .......................... 188/280 |
| 4,113,071 | A | * | 9/1978 | Muller et al. | ............. 188/282.8 |
| 4,114,735 | A | * | 9/1978 | Kato | ......................... 188/282.5 |
| 4,307,875 | A | * | 12/1981 | Schnitzius et al. | .......... 267/120 |
| 4,433,759 | A | * | 2/1984 | Ichinose | .................. 188/282.8 |
| 4,503,951 | A | * | 3/1985 | Imaizumi | ..................... 188/280 |
| 4,561,524 | A | * | 12/1985 | Mizumukai et al. | ...... 188/282.4 |
| 4,591,033 | A | * | 5/1986 | Taylor | .......................... 188/317 |
| 4,595,182 | A | * | 6/1986 | Freitag et al. | .............. 267/120 |
| 4,834,222 | A | * | 5/1989 | Kato et al. | ................... 188/280 |

(Continued)

FOREIGN PATENT DOCUMENTS

EP 752357 A2 * 1/1997

(Continued)

*Primary Examiner*—Christopher P Schwartz
(74) *Attorney, Agent, or Firm*—Manabu Kanesaka

(57) ABSTRACT

A shock absorbing device uses a damper including a cylinder enclosing a viscous fluid; a piston rod; and a piston dividing the interior of the cylinder in two axially separated parts. The piston is connected to the piston rod and has an orifice communicating the two parts. The piston includes an inner member integrally connected with the piston rod, and an outer member disposed about an outer perimeter of the inner member and configured to be axially movable with respect to the inner member. The inner and outer members are configured to define a gap therebetween through which the viscous fluid can flow, and to be biased away from each other by a spring disposed therebetween. The inner and outer members are arranged so that the gap is reduced as the amount that the inner member protrudes into the outer member increases, to thereby define a variable orifice.

10 Claims, 7 Drawing Sheets

U.S. PATENT DOCUMENTS

| | | | |
|---|---|---|---|
| 4,867,286 A * | 9/1989 | Taylor | 188/282.5 |
| 4,938,324 A * | 7/1990 | Van Dyke | 188/317 |
| 5,570,763 A * | 11/1996 | Parejo | 188/282.8 |
| 5,579,874 A * | 12/1996 | Jeffries et al. | 188/282.9 |
| 5,730,260 A * | 3/1998 | Thyssen | 188/266.5 |
| 5,799,759 A * | 9/1998 | Koch | 188/300 |
| 5,839,719 A * | 11/1998 | Hosan et al. | 267/64.12 |
| 5,927,448 A * | 7/1999 | Yamazaki | 188/281 |
| 5,988,608 A * | 11/1999 | Koch | 267/120 |
| 6,007,057 A * | 12/1999 | Fuhrmann et al. | 267/64.15 |
| 6,408,483 B1 * | 6/2002 | Salice | 16/85 |
| 6,913,128 B2 * | 7/2005 | Muller | 188/322.15 |
| 7,063,343 B1 * | 6/2006 | Chen | 280/276 |
| 2003/0029684 A1 | 2/2003 | Forster | |
| 2003/0141638 A1 * | 7/2003 | Salice | 267/34 |
| 2005/0139440 A1 * | 6/2005 | Tomiji | 188/280 |

FOREIGN PATENT DOCUMENTS

| | | | |
|---|---|---|---|
| FR | 2414153 A * | 9/1979 | |
| JP | 08-215475 | 8/1996 | |
| JP | 2001146873 A | 5/2001 | |
| NL | 105179 A | 5/1963 | |

* cited by examiner

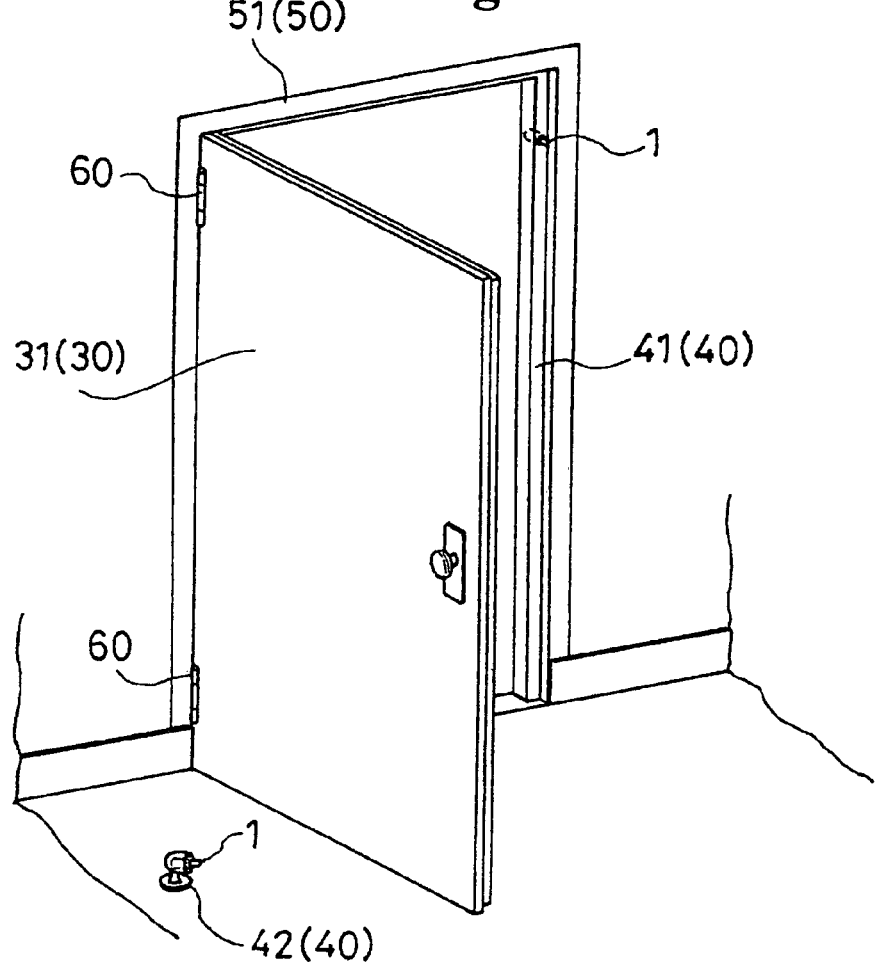
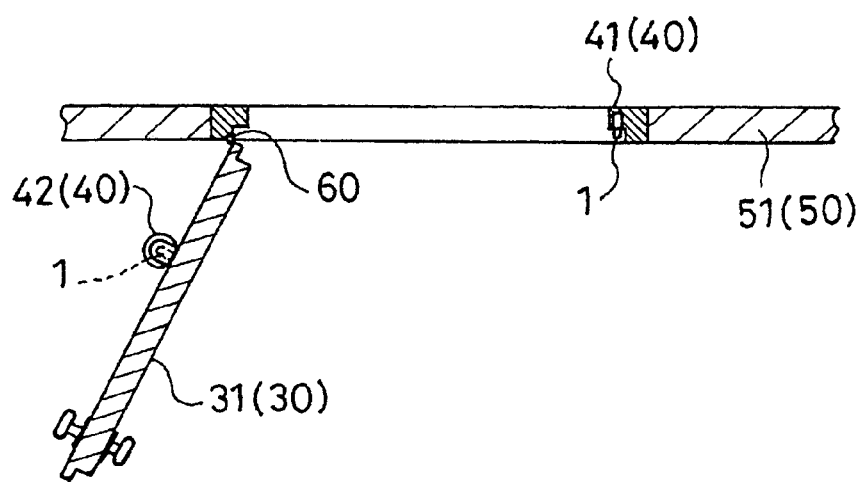

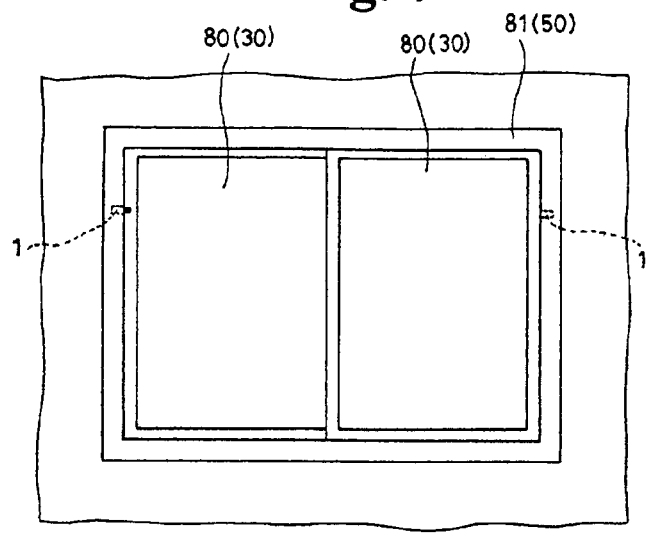
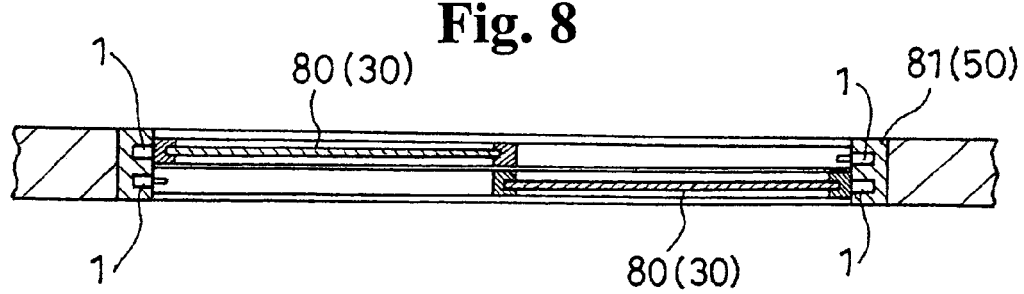
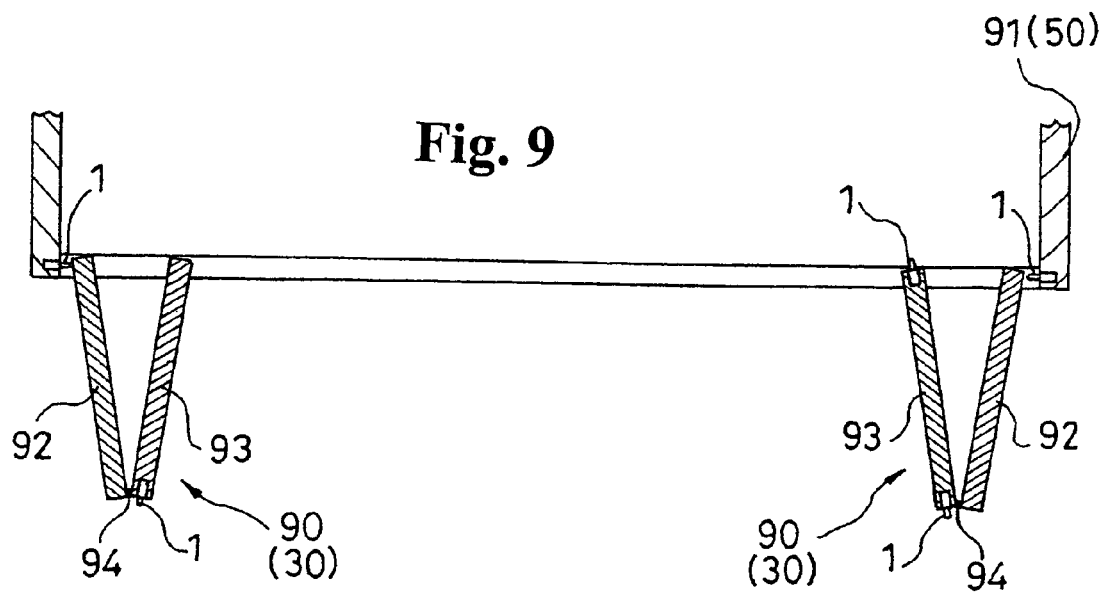

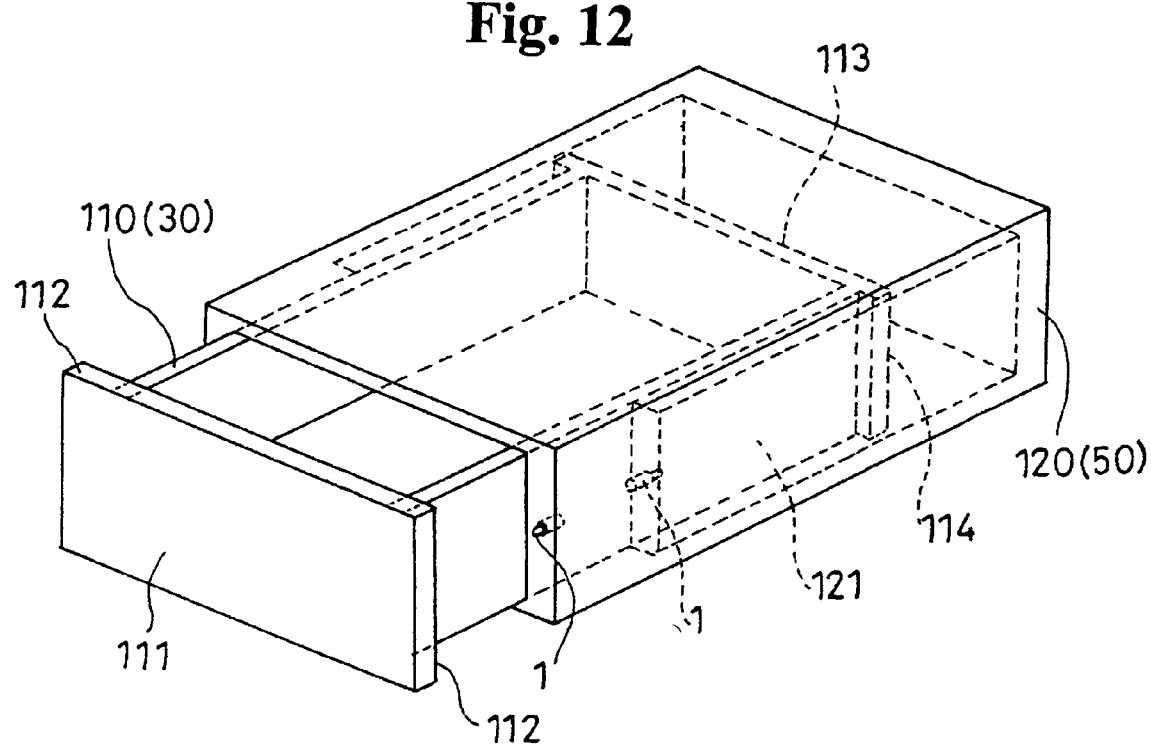
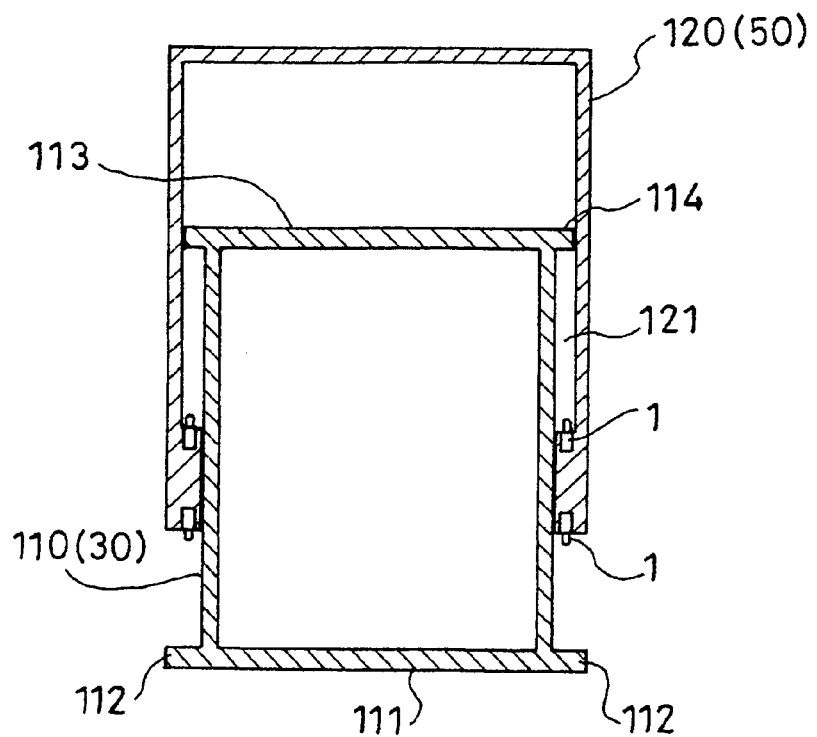

SHOCK ABSORBING DEVICE FOR MOVING BODY

CROSS-REFERENCE TO RELATED APPLICATION

This is a continuation-in-part application of Ser. No. 11/009,043 filed on Dec. 13, 2004.

BACKGROUND OF THE INVENTION AND RELATED ART STATEMENT

The present invention relates to a shock absorbing device for arresting the movement of a moving body and more specifically to shock absorbing device which uses a damper having a cylinder that slidingly receives a piston having an orifice and which is filled with a viscous fluid.

It is known that, in order to prevent the generation of impact noise which tends to be produced when a structure such as a cabinet door, or the like, is closed rapidly, a damper, which reduces the speed of the speed at which the door closes, can be disposed on a door stop of the cabinet.

As a damper for generating such damping force, there is known one that has a cylinder enclosing a viscous fluid, a piston which divides the interior of the cylinder into two axially separated sections and which has an orifice communicating the two sections, and a piston rod connected to the piston. This damper is arranged to generate a damping force (attenuating force) using the resistance produced by the viscous fluid passing through the orifice when the piston moves in the axial direction inside the cylinder together with the piston rod, which is known in Patent Document.

Japanese Patent No. 3465978

The above damper arrangement utilizes the property that the fluid resistance of the viscous fluid is increased progressively as the speed of movement of the piston becomes higher, and when used, for example as a door buffer device, it can be configured such that the resistance is low for gentle door closing operation and high for rapid door closing operation.

However, setting of the damping force is accomplished exclusively by the sizing of the aperture of the orifice provided in the piston, and there is a shortcoming that when the operating force at low speed is set appropriately, the damping force at high speed becomes rather insufficient, and conversely, when the damping force at high speed is set appropriately, the operability at low speed is impeded. Accordingly, it has been difficult to set the dynamic range of the damping force over a wide operating range.

The present invention has been made to obviate the above problems, and an object of the invention is to provide a damper which can set a dynamic range over a wide operating range.

Further objects and advantages of the invention will be apparent from the following description of the invention.

SUMMARY OF THE INVENTION

In order to solve such problem and to provide a damper in which the ratio of the change of damping force to the change of piston speed can be increased and the applicable damping range can be expanded, a first aspect of the invention is such that a damper (1) comprises a cylinder (3) enclosing a viscous fluid and divided in two parts or chambers in the axial direction by a piston (4) which has an orifice (13) which communicates the axially separated chambers, and which is also arranged to generate damping force by resistance of the viscous fluid passing through the orifice when the piston moves in the axial direction inside the cylinder together with a piston rod (5) connected to that piston. In accordance with this aspect of the invention, the piston comprises an inner member (4a) which is integral with the piston rod, and an outer member (4b) disposed about the outer perimeter of the inner member so as to be capable of axial displacement with respect to the inner member. These inner and outer members are fitted together so as to define a gap (G) through which the viscous fluid can flow, and are also biased away from each other by a compression coil spring (second compression coil spring 12). The gap is reduced as the amount that the inner member protrudes into the outer member, increases and thus defines a variable orifice.

In addition to this, the cylinder is fixed to one of two colliding parts such as a moving body (30) and a movement restricting part (40) which limits or restricts the movement of the moving body by contacting with the moving body, and is arranged such that the piston is pushed inside said cylinder by the piston rod being pushed by the other colliding part.

With this arrangement, when the damper is in a state in which the movement speed of the piston rod is comparatively low, the gap between the inner member and the outer member is relatively wide and is maintained by the bias of the compression coil spring. Under these conditions, the fluid resistance of the viscous fluid is kept sufficiently low such that the operability of the device is not impaired.

When the speed of the piston rod exceeds a predetermined value and the resistance force of the viscous fluid acting on the outer member rises above the biasing force of the compression coil spring, the coil spring contracts and the inner member moves into the outer member. In accordance with this relative movement, the gap between the inner member and the outer member is reduced and the resistance to the flow of the viscous fluid passing through that gap, is further increased. A greater damping force is therefore generated.

Accordingly, in accordance with this embodiment of the present invention, a highly beneficial effect can be achieved wherein the ratio of the change of damping force with respect to the change of piston speed, is increased and the applicable range of the damper is expanded.

Therefore, in accordance with this embodiment of The shock absorbing device, the impact of the moving body can be attenuated, and the generation of unpleasant noise, and the like, can be reduced.

BRIEF DESCRIPTION OF THE DRAWINGS

FIG. 3 is a perspective view of a door.

FIG. 4 is a sectional view of the door in FIG. 3.

FIG. 7 is a front view of a window.

FIG. 8 is a sectional view of the window shown in FIG. 7.

FIG. 9 is a sectional view of a folding door.

FIG. 12 is a perspective view of a drawer.

FIG. 13 is a sectional view of the drawer in FIG. 12.

DETAILED DESCRIPTION OF PREFERRED EMBODIMENTS

The embodiments of the present invention will now be explained in detail with reference to the appended drawings.

Figure 1:
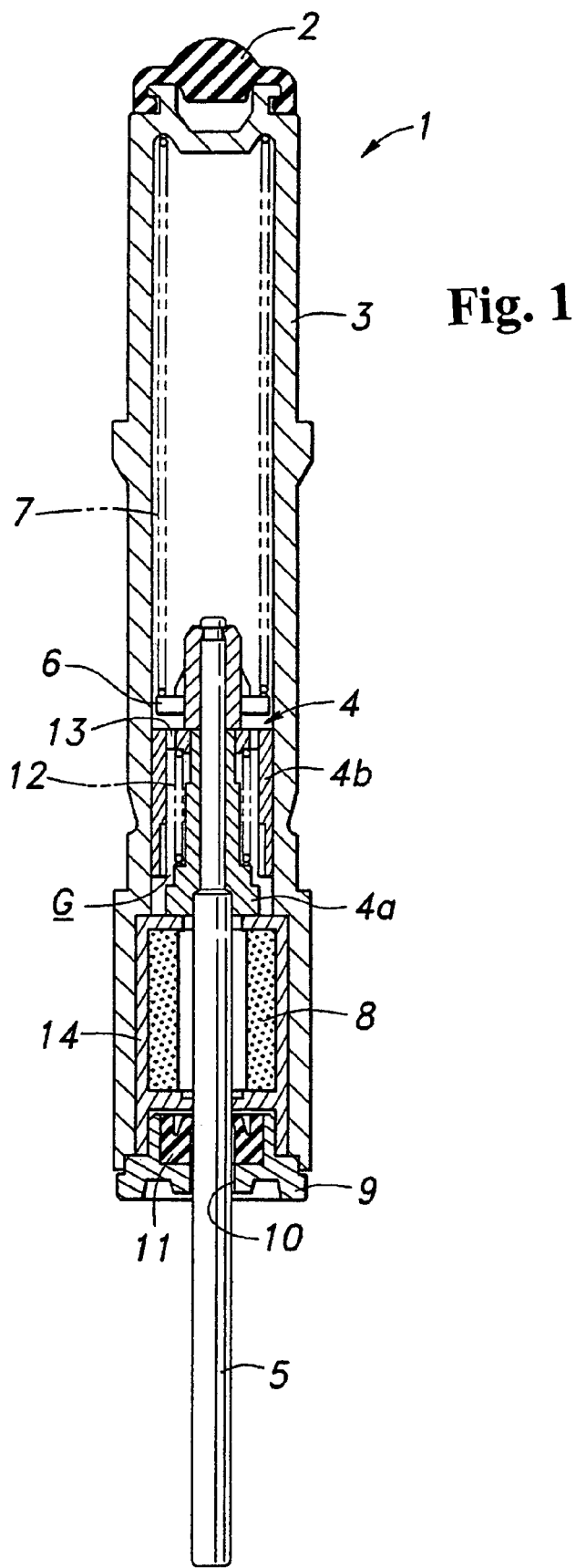
FIG. 1 is a sectional view of a damper during low-speed operation.

FIG. 1 is a sectional view of a damper according to an embodiment of the present invention. This damper 1 includes a cylinder 3 wherein one end is closed and a cushion rubber 2 is attached thereto. A piston 4 is slide-coupled inside the cylinder 3, and a piston rod 5 is connected to the piston 4. A first compression coil spring 7 is disposed between a spring retainer 6 provided on the inboard end of the piston rod 5 and the closed end of the cylinder 3. An accumulator 8 is provided within the cylinder in the manner shown. A cap 9 closes the open end of the cylinder in a manner wherein the piston rod 5 extends through a hole 10 in the cap 9 via an oil seal 11 and extends out of the cylinder 3. The cylinder 3 is filled with a silicon oil having a suitable viscosity.

The piston 4 comprises an inner member 4a which is integral (fixedly connected) with the inboard end of the piston rod 5 (upper end as seen in the drawings), and an outer member 4b which is fitted onto the inner member 4a so as to define a prescribed gap G between the outer perimeter surface of the inner member 4a. The outer member 4b is slide-coupled to the inner perimeter of the cylinder 3. A compression coil spring 12 is disposed between the inner member 4a and the outer member 4b so as to force the two axially away from each other. The external dimensions of the inner member 4a changes becoming stepwisely larger in the direction of the outboard end (lower end as seen in the drawings) and it is configured so that the gap G between the inner member 4a and the outer member 4b, becomes narrower when the amount that the inner member 4a which protrudes into the interior of the outer member 4b, is increased. Also, the outer member 4b assumes a cylindrical shape with a bottom, and has a fixed orifice 13 having a suitable aperture for allowing the silicon oil to flow past, formed in an inboard wall thereof.

The accumulator 8 has a cylindrical shape and is formed of a foamed synthetic resin material of a type having a suitable degree of resilience and which contracts when a prescribed pressure is applied. The accumulator is held in place by means of a retainer 14 which is disposed on the inner perimeter surface on the cylinder.

Next, an outline of the operation of the damper according to the present invention is given.

Usually, as shown in FIG. 1, the piston rod 5 protrudes out from the center hole 10 of the cap 9, in accordance with the biasing force of the first compression coil spring 7. Also, the outer member 4b of the piston 4 is prevented from bouncing against the spring retainer 6 provided on the inboard end of the piston rod 5, by the second compression coil spring 12.

The cylinder 3 is, for example, fixed by a suitable means for example to the inside surface of the side wall of a cabinet in this embodiment.

When the cabinet door is closed slowly, the piston rod 5 which is pushed by the inside surface of the door, is pushed inside the cylinder 3 in opposition to the spring force of the first compression coil spring 7. At this time, the silicon oil in the upper chamber as seen in the drawings, is pumped into the lower chamber through the orifice 13 of the outer member 4b of the piston 4, and through the gap G between the outer member 4b and the inner member 4a. The kinetic energy applied to the piston rod 5 is attenuated by the fluid resistance of the silicon oil. In this state, the outer member 4b and the inner member 4a are maintained separated by the spring force of the second compression coil spring 12, and because the gap G between the outer member 4b and the inner member 4a is kept wide, the damping force is kept in a low range.

When the piston rod 5 is moved into the cylinder 3, although the seal pressure of the silicon oil is increased by reduction of the internal volume of the cylinder 3 by that amount, this is absorbed by the compression deformation of the accumulator 8 made of foamed synthetic resin material.

Figure 2:
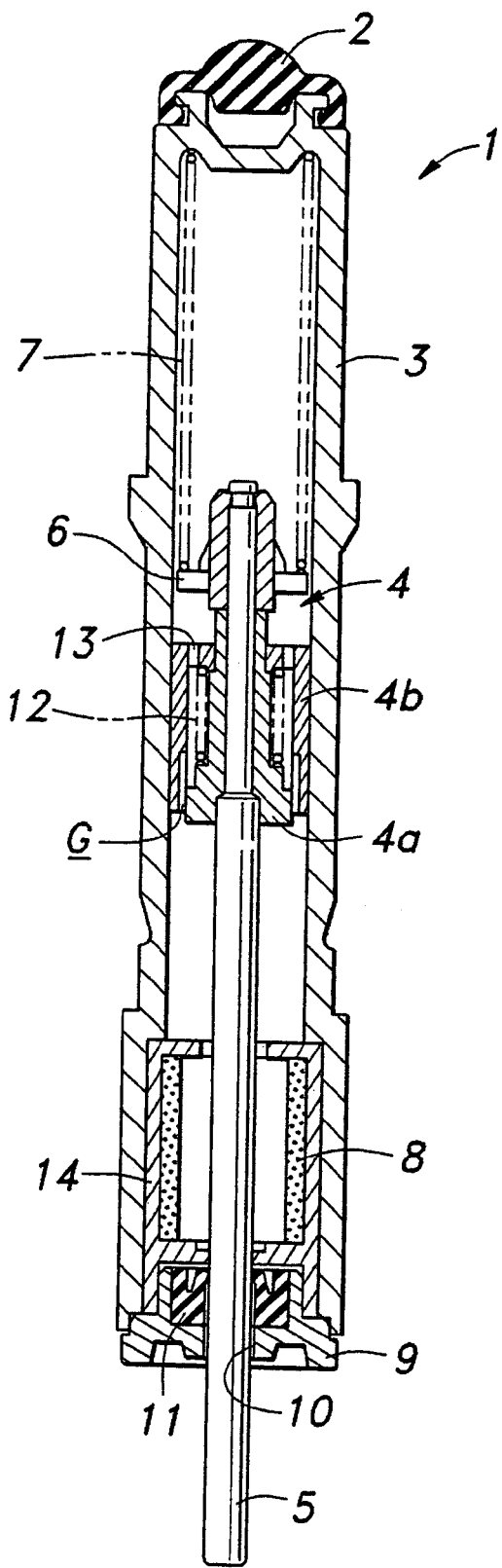
FIG. 2 is a sectional view of a damper during high-speed operation.

Now, because the fluid resistance of the silicon oil increases progressively with the piston speed, for example, if it is set in advance such that the second compression coil spring 12 contracts due to the pressure of the silicon oil acting on the inboard end of the outer member 4b when the piston 4 moves at over a predetermined speed, because the outer member 4b becomes harder to move above the predetermined speed, the second compression coil spring 12 is compressed, and, as shown in FIG. 2, the inner member 4a moves into the outer member 4b. Accordingly, because the gap G between the inner member 4a and the outer member 4b becomes narrower, the damping force increases due to the increased resistance to flow of the silicon oil between the inner and outer members 4a, 4b.

Thus, in accordance with this embodiment of the present invention, because the compression coil spring 12 is used for speed sensing and for performing switching of the damping force by a variable orifice, the damper can be constructed so that the variation of switching speed due to change of atmospheric temperature, for example, can be attenuated.

Also, because the variable orifice is constituted by the gap G between two members, namely the inner member 4a and the outer member 4b, which move relative to one and other in the axial direction, the dynamic range of attenuating force corresponding to the change of speed of the piston rod 5 can be increased, and therefore the degree of freedom for setting of the operating characteristics can be increased.

Next, a shock absorbing device 20 using a damper 1 having the above construction, is explained.

Concretely, in the shock absorbing device 20, as shown in FIGS. 3-4, between two colliding parts, defined by a moving body 30 for example a door 31, and a movement restricting part 40 for restricting movement of that door 31 (moving body 30) by contacting with the door 31 (moving body 30), that is, a door stop 41 or a door stopper 42 on a base 50 for example such as a door frame 51 which supports the door 31 (moving body 30) to be capable of movement (capable of rotation), the cylinder 3 is fixed to either colliding part (for example door stop 41 or door stopper 42), and it is made such that the piston 4 is pushed inside the cylinder 3 by the piston rod 5 being pushed by the other colliding part (door 31).

As a result, the impact force for example of the door 31 (moving body 30) colliding with the door stop 41 or door stopper 42 (movement restricting part 40) can be attenuated by the damper 1, and the occurrence of unpleasant noise, and the like, during collision can be reduced.

Also, in the case when the door 31 (moving body 30) is opened and closed vigorously, the piston speed is accelerated, and the damping force of the damper 1 is increased.

Next, a door 31 as one example of a moving body 30 is explained using FIGS. 3-4.

The door 31 is supported so as to be capable of opening and closing on a door frame 51 (base 50) by means of hinges 60 having axes which extend in the vertical direction.

On the door stop 41 (movement restricting part 40) of the door frame 51, the cylinder 3 of a damper 1 is fixed in an embedded manner, and its piston rod 5 is arranged to protrude toward the door 31.

Also, a door stopper 42 (movement restricting part 40) is fixed on the floor.

The cylinder 3 of another damper 1 is fixed to the door stopper 42, and its piston rod 5 is arranged to protrude toward the door 31.

Although the piston rod 5 was arranged to protrude toward the door 31, conversely, the piston rod 5 may be fixed and the cylinder 3 may be arranged to protrude toward the door 31.

Although the piston rod 5 or cylinder 3 was arranged to protrude directly toward the door 31, this embodiment of the invention is not limited to this arrangement, and although it is not illustrated, an intermediate member may be interposed. That is, as the piston rod 5 moves in the axial direction by the colliding of the other colliding part, which is the door 31, the intermediate member, although it is not illustrated, is for transmitting that axial directional force to the piston rod 5. For example, as the intermediate member, although it is not illustrated, a rubber cap, or the like, may be put on the protruding part of the piston rod 5.

Although the damper 1 was fixed to the door stop 41 or the door stopper 42 being the movement restricting part 40, conversely, it may be fixed to the door 31 being the moving body 30.

Also, the number of dampers 1 is not limited to that shown in the drawings, and it can be suitably selected.

Examples of a vertical shaft rotating type which rotates about a shaft which extends in the vertical direction, such as a hinge 60 of a door 31, are as follows:

(1) Rotating Type Opening-and-closing Door of Furniture

The base 50, although not illustrated, is a storage part of furniture, and in this instance, the moving body 30 becomes a rotating type opening-and-closing door for opening and closing the storage part.

(2) Rotating Type Opening-and-closing Door of System Kitchen

The furniture, although not illustrated, may be a system kitchen, and in this instance, the moving body 30 becomes a rotating type opening-and-closing door for opening and closing the system kitchen.

(3) Rotating Type Opening-and-closing Door of Home Electric Appliance

The base 50, although not illustrated, is a storage part of a home electric appliance, and at this time, the moving body 30 becomes a rotating type opening-and-closing door for opening and closing the storage part.

(4) Rotating Type Front Door of Refrigerator

The home electric appliance, although not illustrated, is a refrigerator, and at this time, the moving body 30 becomes a rotating type front door for opening and closing the refrigerator. As will be understood, the term refrigerator also includes devices such as a freezer.

(5) Rotating Type Front Door of Middle Case of Refrigerator (Including Freezer)

The moving body 30, although not illustrated, may be an opening-and-closing door of a middle case inside a refrigerator, and at this time, the moving body 30 becomes a rotating type front door for opening and closing the middle case.

(6) Rotating Type Opening-and-closing Door of Hot Cooking Appliance (for Example Microwave Oven, Toaster)

The home electric appliance, although not illustrated, may be a cooking appliance for example such as a microwave oven or toaster, and at this time, the moving body 30 becomes a rotating type front door for opening and closing the hot cooking appliance.

(7) Rotating Type Opening-and-closing Door of Washing Machine

The home electric appliance, although not illustrated, may be a washing machine, and at this time, the moving body 30 becomes a rotating type opening-and-closing door for opening and closing the washing machine.

(8) Rotating Type Opening-and-closing Door of Dryer

The home electric appliance, although not illustrated, may be a dryer, and at this time, the moving body 30 becomes a rotating type opening-and-closing door for opening and closing the dryer.

(9) Rotating Type Front Door of Dishwasher

The home electric appliance, although not illustrated, may be a dishwasher, and at this time, the moving body 30 becomes a rotating type front door for opening and closing the dishwasher.

(10) Rotating Type Opening-and-closing Door of Vacuum Cleaner

The home electric appliance, although not illustrated, may be a vacuum cleaner, and at this time, the moving body 30 becomes a rotating type opening-and-closing door for exchanging the filter, or the like.

(11) Rotating Type Opening-and-closing Door of Office Cabinet

The base 50, although not illustrated, may be an office cabinet, and at this time, the moving body 30 may be a rotating type opening-and-closing door for opening and closing the cabinet.

(12) Rotating Type Door of Automobile

The base 50, although not illustrated, may be an automobile, and at this time, the moving body 30 becomes a rotating type door of the automobile.

(13) Rotating Type Door Handle of Automobile

The base 50, although not illustrated, may be a door of an automobile, and at this time, the moving body 30 becomes a rotating type handle for opening and closing the door.

(14) Cup Holder of Automobile

The base 50, although not illustrated, may be a storage part of a cup holder inside a car, and at this time, the moving body 30 becomes a rotating type cup holder which is attached in the storage part to be capable of opening and closing.

(15) Opening-and-closing Door of Display Refrigerator

The base 50, although not illustrated, may be a display refrigerator, and at this time, the moving body 30 becomes a rotating type opening-and-closing door for opening and closing the display refrigerator.

Display refrigerator is used generically and includes freezers and the like.

(16) Front Door of Commercial Game Machine

The base, although not illustrated, may be a commercial game machine for example such as a "pachinko" (pin ball) machine or pachisuro (slot machine game) machine, and at this time, the moving body 30 becomes a rotating type front door for opening and closing the commercial game machine.

Figure 5:
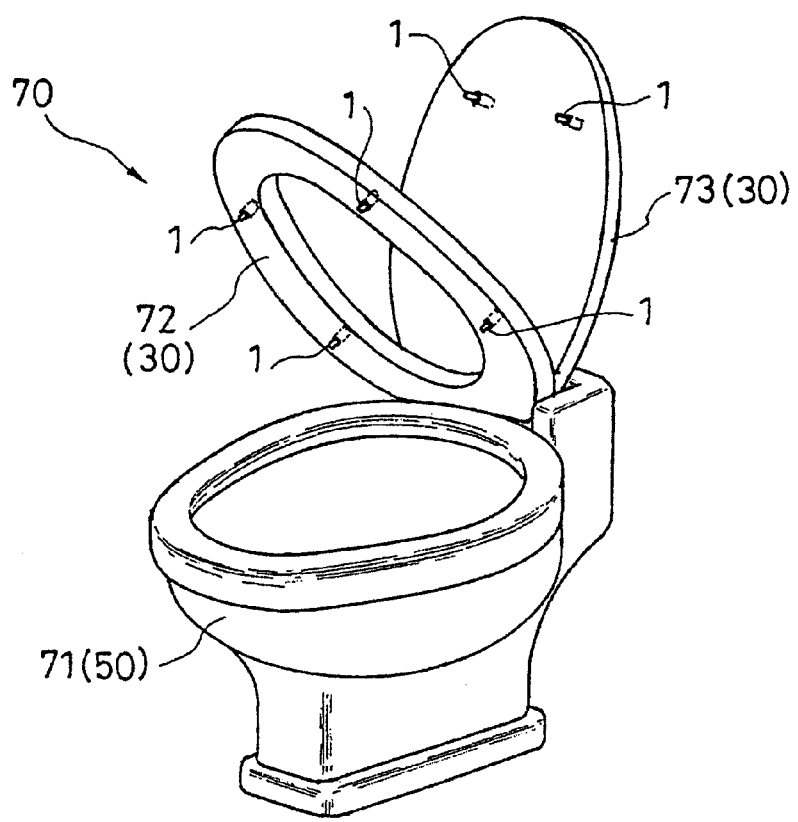
FIG. 5 is a perspective view of a toilet.
Figure 6:
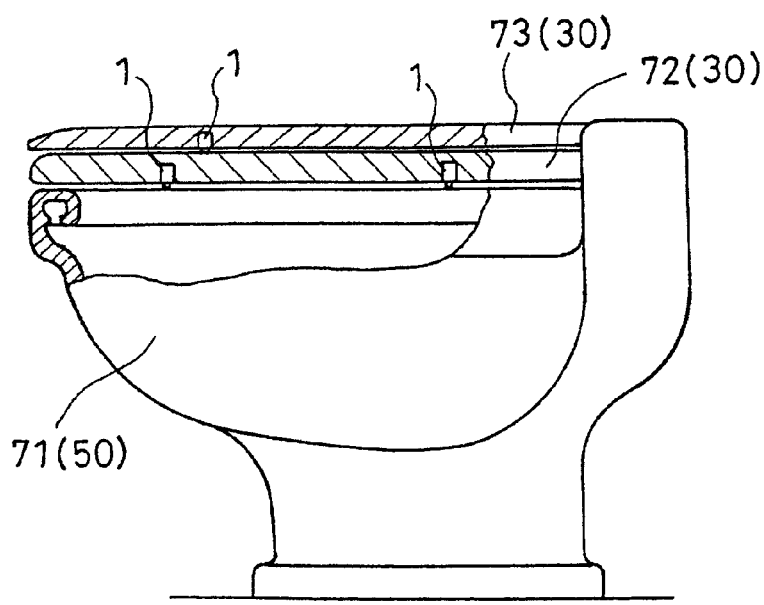
FIG. 6 is a partial sectional view of the toilet in FIG. 5.

(17) Other
(17-1) Rotating type shutter of air exchanging fan or air intake fan of building
(17-2) Rotating type opening-and-closing door of cupboard
(17-3) Rotating type opening-and-closing door of clog cabinet
(17-4) Rotating type opening-and-closing door of bookshelf
(17-5) Rotating type garage door
(17-6) Rotating type gate door (17-7) Rotating type bathroom door
(17-8) Rotating type water supply tank storage part of microwave oven
(17-9) Rotating type opening-and-closing door of locker
(17-10) Rotating type opening-and-closing door of safe
(17-11) Air conditioner
(17-12) Rotating type rear hatch or glass hatch of automobile
(17-13) Rotating type spare tire carrier of automobile
(17-14) Rotating type inner door handle of automobile
(17-15) Rotating type opening-and-closing handle of commercial refrigerator (freezer)
(17-16) Rotating type front door of vending machine Next, a toilet 70 is explained using FIGS. 5-6.

On the toilet main body 71 of the toilet 70 which is the base 50, the toilet seat 72 and the toilet lid 73, which are moving bodies 30, are supported to be capable of opening and closing by means of a hinge (not illustrated) which is pivotal about a horizontally extending a shaft.

The cylinder 3 of a damper 1 is fixed to the bottom side of the toilet seat 72 (moving body 30), and its piston rod 5 is arranged to protrude toward the toilet main body 71. At this time, the movement restricting part 40 becomes the top side of the toilet main body 71, and the colliding parts become the bottom side of the toilet seat 72 and the top side of the toilet main body 71.

Also, the cylinder 3 of another damper 1 is fixed to the bottom side of the toilet lid 73 (moving body 30), and its piston rod 5 is arranged to protrude toward the toilet seat 72. At this time, the movement restricting part 40 becomes the top side of the toilet seat 72, and the colliding parts become the bottom side of the toilet lid 73 and the top side of the toilet seat 72.

Although the damper 1 is fixed to the bottom side of the toilet seat 72 which is a moving body 30, conversely, it may be fixed to the top side of the toilet main body 71 which is the base 50. Also, although the damper 1 was fixed to the bottom side of the toilet seat 72 which is a moving body 30, conversely, it may be fixed to the top side of the toilet seat 72.

Also, the number of dampers 1 is not limited to that shown in the drawings, and it can be suitably selected.

As examples of horizontal shaft rotating type which rotate about a shaft extending in the horizontal direction, such as a hinge (not illustrated) of a toilet seat 72 and a toilet lid 73, there are those such as the following.

(1) Rotating Type Opening-and-closing Door of Furniture

The base 50, although not illustrated, may be a storage part of furniture, and at this time, the moving body 30 becomes a rotating type opening-and-closing door for opening and closing the storage part.

(2) Rotating Type Opening-and-closing Door of System Kitchen

The furniture, although not illustrated, may be a system kitchen, and at this time, the moving body 30 becomes a rotating type opening-and-closing door for opening and closing the system kitchen.

(3) Rotating Type Opening-and-closing Door of Home Electric Appliance

The base 50, although not illustrated, may be a storage part of a home electric appliance, and at this time, the moving body 30 becomes a rotating type opening-and-closing door for opening and closing the storage part.

(4) Rotating Type Front Door of Refrigerator

The home electric appliance, although not illustrated, may be a refrigerator, and at this time, the moving body 30 becomes a rotating type front door for opening and closing the refrigerator. The term refrigerator is again used in a manner which should be understood to include freezers.

(5) Rotating Type Front Door of Middle Case of Refrigerators (Including Freezers)

The moving body 30, although not illustrated, may be an opening-and-closing door of a middle case inside a refrigerator, and at this time, the moving body 30 becomes a rotating type front door for opening and closing the middle case.

(6) Rotating Type Opening-and-closing Door of Hot Cooking Appliance (for Example Microwave Range, Toaster)

The home electric appliance, although not illustrated, may be a cooking appliance for example such as a microwave oven or toaster, and at this time, the moving body 30 becomes a rotating type front door for opening and closing the hot cooking appliance.

(7) Rotating Type Opening-and-closing Lid of Information Appliance (for Example Copy Machine, Fax Machine, Copy Machine, Combined Machine)

The home electric appliance, although not illustrated, may be an information appliance, for example such as a copy machine, fax machine, copy machine or combined machine of these, and at this time, the moving body 30 becomes an opening-and-closing lid, or opening-and-closing lid with ADF (auto document feeder), of the information appliance.

(8) Rotating Type Opening-and-closing Door of Washing Machine

The home electric appliance, although not illustrated, may be a washing machine, and at this time, the moving body 30 becomes a rotating type opening-and-closing door for opening and closing the washing machine.

(9) Rotating Type Opening-and-closing Door of Dryer

The home electric appliance, although not illustrated, may be a dryer, and at this time, the moving body 30 becomes a rotating type opening-and-closing door for opening and closing the dryer.

(10) Rotating Type Front Door of Dishwasher

The home electric appliance, although not illustrated, may be a dishwasher, and at this time, the moving body 30 becomes a rotating type front door for opening and closing the dishwasher.

(11) Rotating Type Opening-and-closing Door of Vacuum Cleaner

The home electric appliance, although not illustrated, may be a vacuum cleaner, and at this time, the moving body 30 becomes a rotating type opening-and-closing door for exchanging the filter, or the like.

(12) Rotating Type Top Lid of Rice Cooker

The home electric appliance, although not illustrated, may be a rice cooker, and at this time, the moving body 30 becomes a rotating type top lid for opening and closing the rice cooker.

(13) Rotating Type Top Lid of Electric Pot

The home electric appliance, although not illustrated, may be an electric pot, and at this time, the moving body 30 becomes a rotating type top lid for opening and closing the electric pot.

(13) Rotating Type Opening-and-closing Door of Office Cabinet

The base 50, although not illustrated, may be an office cabinet, and at this time, the moving body 30 becomes a rotating type opening-and-closing door for opening and closing the cabinet.

(14) Rotating Type Door Handle of Automobile

The base 50, although not illustrated, may be a door of an automobile, and at this time, the moving body 30 may be a rotating type handle for opening and closing the door.

(15) Rotating Type Hood Lid of Hood of Automobile

The base 50, although not illustrated, may be a hood of an automobile, and at this time, the moving body 30 becomes a rotating type hood lid for opening and closing the hood.

(16) Rotating Type Trunk Lid of Trunk of Automobile

The base 50, although not illustrated, may be a trunk of an automobile, and at this time, the moving body 30 becomes a rotating type trunk lid for opening and closing the trunk.

(17) Rotating Type Glove Compartment Lid of Glove Compartment of Automobile

The base 50, although not illustrated, may be a storage part of a glove compartment of an automobile, and at this time, the moving body 30 may be a rotating type glove compartment lid for opening and closing the storage part.

(18) Rotating Type Cup Holder of Automobile

The base 50, although not illustrated, may be a storage part of a cup holder inside a car, and at this time, the moving body 30 may be a rotating type cup holder which is attached in the storage part to be capable of opening and closing.

(19) Rotating Type Console Lid of Console of Automobile

The base 50, although not illustrated, may be a console for example such as a center console inside a car, and at this time, the moving body 30 may be a rotating type console lid for opening and closing the console.

(20) Rotating Type Opening-and-closing Door of Display Refrigerator

The base 50, although not illustrated, may be a display refrigerator, and at this time, the moving body 30 becomes a rotating type opening-and-closing door for opening and closing the display refrigerator.

Display refrigerator is used generically and includes freezers.

(21) Other (21-1) Rotating type shutter of air exchanging fan or air intake fan of building (21-2) Rotating type opening-and-closing lid of sub-floor storage of building (21-3) Rotating type opening-and-closing door of cupboard (21-4) Rotating type opening-and-closing door of clog cabinet (21-5) Adjustable angle back of chair (21-6) Writing desk (21-7) Rotating type garage door (21-8) Rotating type opening-and-closing door of mailbox (21-9) Keyboard opening-and-closing lid of keyboard instrument such as piano, organ or electronic keyboard (21-10) Rotating type opening-and-closing lid of wastebasket (21-11) Rotating type ice machine or ice chest of refrigerator (freezer)

(21-12) Rotating type opening-and-closing lid of scanner (21-13) Air conditioner (21-14) Rotating type rear hatch or glass hatch of automobile (21-15) Rotating type spare tire carrier of automobile (21-16) Rotating type seat (folding, storable, removable) of automobile (21-17) Rotating type ashtray of automobile (21-18) Rotating type seat back table of automobile (21-19) Rotating type storage lid of luggage floor of automobile (21-20) Rotating type opening-and-closing door of vending machine Next, a window 80 as one example of a moving body 30 is explained using FIGS. 7-8.

Left and right windows 80 are supported to be drawn contrarily on a window frame 81 which functions as the base 50.

The cylinders 3 of dampers 1 are fixed in an embedded manner on the left and right inside surfaces of the window frame 81, so that their piston rods 5 respectively protrude toward the windows 80. At this time, the movement restricting parts 40 become the left and right inside surfaces of the window frame 81, and the colliding parts become the left and right ends of the left and right windows 80 and the left and right inside surfaces of the window frame 81.

Although the dampers 1 are fixed to the window frame 81 which functions as the frame 50, conversely, they may be fixed to the windows 80 being the moving bodies 30.

Also, the number of dampers 1 is not limited to that shown in the drawings, and it can be suitably selected.

Figure 10:
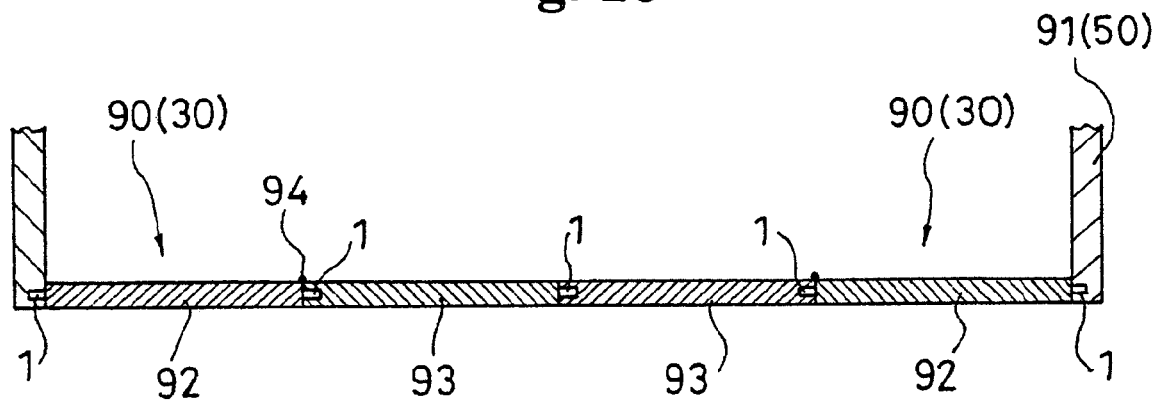
FIG. 10 is a sectional view showing the state in which the folding door in FIG. 9 is closed.

Next, a folding door 90 as one example of a moving body 30 is explained using FIGS. 9-10.

The left and right ends of left and right folding doors 90 are supported to be slidable in the left-right direction on a closet 91 which functions as the base 50.

Each folding door 90 is constituted by two doors being an outside door 92 and a center door 93, and the outside door 92 and the center door 93 are folded up in a V shape by means of a hinge 94.

Although not illustrated, slide rails are fixed on the top and bottom of the closet 91, and the ends on the sides that are apart left and right of the outside door 92 and the center door 93 respectively are supported to be capable of sliding on the upper and lower slide rails.

On the left and right inside surfaces of the closet 91, the cylinders 3 of dampers 1 are fixed in an embedded manner, and their piston rods 5 respectively are arranged to protrude toward the left and right folding doors 90. At this time, the movement restricting parts 40 become the left and right inside surfaces of the closet 91, and the colliding parts become the outside ends of the outside doors 92 and the left and right inside surfaces of the closet 91.

Although the dampers 1 are disclosed as being fixed to the closet 91 which functions as the base 50, conversely, they may be fixed to the folding doors 90 being the moving bodies 30.

On the left end of the center door 93 of the right-side folding door 90, the cylinder 3 of a damper 1 is fixed in an embedded manner, and its piston rod 5 is arranged to protrude toward the right end of the center door 93 of the left-side folding door 90. At this time, the movement restricting part 40 becomes either confronting end of the left and right center doors 93, and the colliding parts become the two confronting ends.

Although the damper 1 was fixed to the center door 93 of the right-side folding door 90, conversely, it may be fixed to the center door 93 of the left side folding door 90.

On the end of the center door 93 facing the hinge 94, the cylinder 3 of another damper 1 is fixed in an embedded manner, and its piston rod 5 is arranged to protrude toward the outside door 92. At this time, the movement restricting part 4b becomes either confronting end of the outside door 92 and the center door 93, and the colliding parts become the two confronting ends.

Although the damper 1 was fixed to the center door 93, conversely, it may be fixed to the outside door 92. Also, the number of dampers 1 is not limited to that shown in the drawings, and it can be suitably selected.

As examples of left-right sliding type which slides in the left-right direction, such as a window 80 or a folding door 90, there are those such as the following.

(1) Sliding Type Storm Door

The moving body 30, although not illustrated, may be a storm door of a building.

(2) Sliding Type Shutter

The moving body 30, although not illustrated, may be a shutter of a building.

(3) Sliding Door of Middle Case of Refrigerator (Including Freezer)

The moving body 30, although not illustrated, may be left and right sliding doors of a middle case inside a refrigerator.

The term refrigerator should be understood to include freezers.

(4) Sliding Door of Automobile

The base 50, although not illustrated, is an automobile, and at this time, the moving body 30 may be a sliding door of the automobile.

(5) Sliding Type Cup Holder of Automobile

The base 50, although not illustrated, may be a storage part of a cup holder inside a car, and at this time, the moving body 30 becomes a sliding type cup holder which is attached in the storage part to be capable of sliding to the left and right.

(6) Sliding Type Door of Display Refrigerator

The base 50, although not illustrated, is a display refrigerator, and at this time, the moving body 30 becomes a sliding door for opening and closing the display refrigerator.

The term display refrigerator should be understood to include freezers.

Figure 11:
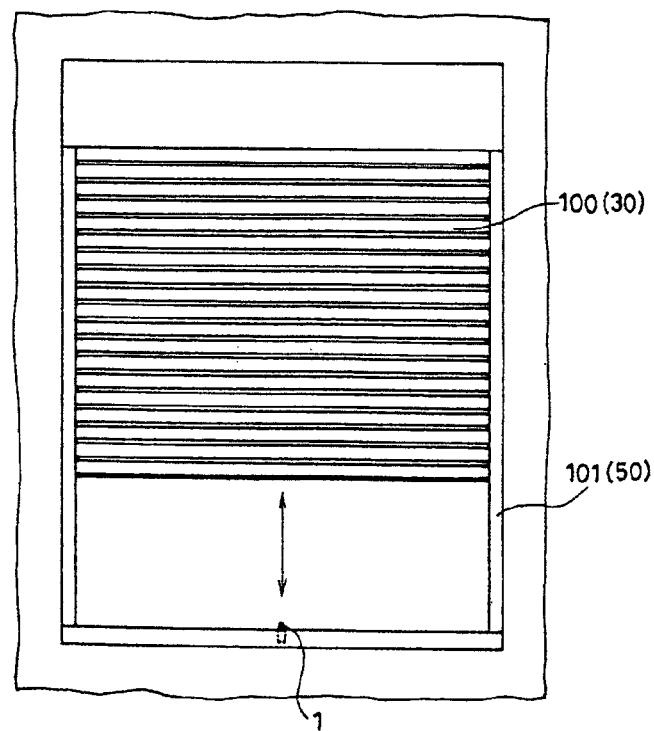
FIG. 11 is a front view of a shutter.

(7) Other (7-1) Sliding type opening-and-closing door of cupboard
(7-2) Sliding type opening-and-closing door of clog cabinet
(7-3) Sliding type opening-and-closing door of bookshelf
(7-4) Sliding type door of vehicle such as electric train/trolley, (steam) train, ship, airplane, or the like
(7-5) Sliding type garage door
(7-6) Sliding type bathroom door
(7-7) Sliding type bookshelf, moving rack
(7-8) Sliding type seat (storable, removable) of automobile Next, a shutter 100 as one example of a moving body 30 is explained using FIG. 11. The shutter 100 is supported to be capable of ascending and descending on a slide frame 101 which functions as a base 50.

On the lower end of the slide frame 101, the cylinder 3 of a damper 1 is fixed in an embedded manner, and its piston rod 5 is arranged to protrude toward the shutter 100. At this time, the movement restricting part 40 becomes the lower end of the slide frame 101, and the colliding parts become the lower end of the shutter 100 and the lower end of the slide frame 101.

Although the damper 1 was fixed to the slide frame 101 which is the base 50, conversely, it may be fixed to the shutter 100 being the moving body 30. Also, the number of dampers 1 is not limited to that shown in the drawings, and it can be suitably selected.

EXAMPLES OF VERTICAL SLIDING TYPE ARRANGEMENTS

As examples of the vertical sliding type which slides in the vertical direction, such as a shutter 100, there are those such as the following.

(1) Ascending-descending Type Blinds
(2) Ascending-descending Type Moving Rack

Next, a drawer 110 as one example of a moving body 30 is explained using FIGS. 12-13.

The drawer 110 is stored to be capable of drawing out in a housing 120 which is a base 50.

A pair of left and right projecting parts 112 which project out to the left and right from the opening of the housing 120 is provided on the front board 111 of the drawer 110. When the drawer 110 is pushed in, the back surfaces of the left and right projecting parts 112 contact the end surfaces on the front side of the housing 120.

On the two left and right ends of the housing 120, the cylinders 3 of dampers 1 respectively are fixed in an embedded manner, and their piston rods 5 respectively are arranged to protrude toward the back surfaces of the left and right projecting parts 112. At this time, the movement restricting parts 40 become the end surfaces on the front side of the housing 120, and the colliding parts become the back surfaces of the left and right projecting parts 112 and the end surfaces on the front side of the housing 120.

Also, a pair of left and right stoppers 114 which project out to the left and right is provided also on the back board 113 of the drawer 110.

As opposed to this, a pair of left and right slide channels 121 in which the left and right stoppers 114 are capable of sliding is provided on the left and right inside surfaces of the housing 111. The dead end of the slide channel 121 limits the maximum drawn-out position of the drawer 110 by contacting the stopper 114.

On the dead ends of the left and right slide channels 121, the cylinders 3 of dampers 1 respectively are fixed in an embedded manner, and their piston rods 5 respectively are arranged to protrude toward the stoppers 114. At this time, the movement restricting parts 40 become the dead ends of the left and right slide channels 121, and the colliding parts become the left and right stoppers 114 and the dead ends of the left and right slide channels 121.

Although the damper 1 was fixed to the housing 111 which is the base 50, conversely, it may be fixed to the drawer 110 which is the moving body 30.

Also, the number of dampers 1 is not limited to that shown in the drawings, and it can be suitably selected.

EXAMPLES OF FORE-AND-AFT SLIDING TYPE

As examples of front-back (fore-and-aft) sliding type which slides in the front-back direction, such as a drawer 110, there are those such as the following.

(1) Drawer or Drawer Type Sliding Table of Furniture

The base 50, although not illustrated, may be a storage part of furniture, and at this time, the moving body 30 becomes a drawer or sliding table which is attached in the storage part to be capable of drawing out.

(2) Drawer or Drawer Type Sliding Table of System Kitchen

The furniture, although not illustrated, may be a system kitchen, and at this time, the moving body 30 becomes a drawer or sliding table which is attached in the storage part of the system kitchen to be capable of drawing out.

(3) Drawer of Home Electric Appliance

The base 50, although not illustrated, may be a storage part of a home electric appliance, and at this time, the moving body 30 may be a drawer which can be drawn out from the storage part.

(4) Drawer of Refrigerator

The home electric appliance, although not illustrated, may be a refrigerator, and at this time, the moving body 30 becomes a drawer of the refrigerator.

The term refrigerator should be understood to include freezers.

(5) Drawer of Middle Case of Refrigerator (Including Freezer)

The moving body 30, although not illustrated, may be a drawer of a middle case inside a refrigerator.

(6) Drawer Type Paper Feed Tray of Information Appliance (for Example Copy Machine, Fax Machine, Copy Machine, Combined Machine)

The home electric appliance, although not illustrated, may be an information appliance, for example such as a copy machine, fax machine, copy machine or combined machine of these, and at this time, the moving body 30 becomes a drawer type paper feed tray.

(7) Drawer Type Cup Holder of Automobile

The base 50, although not illustrated, may be a storage part of a cup holder in a car, and at this time, the moving body 30 may be a drawer type cup holder which is attached in the storage part to be capable of drawing out.

(8) Other (8-1) Drawer or drawer type sliding table of furniture
(8-2) Drawer or drawer type sliding table of cupboard
(8-3) Drawer, drawer type sliding table or drawer type keyboard table of various kinds of desks such as writing desk, school desk, office desk, and PC desk
(8-4) Drawer type water supply tank of refrigerator (freezer)
(8-5) Drawer type ice machine or ice chest of refrigerator (freezer)
(8-6) Drawer of office cabinet
(8-7) Sliding type ashtray of automobile
(8-8) Drawer of cash register (Other Parts Used)

Other parts used and uses of the shock absorbing device 20 are as follows.

(1) Inclined Display Shelf

The moving body 30, although not illustrated, is a commercial product such as a beverage can, and the base 50 may be a display shelf for displaying the commercial product on an incline. Also, it may be made so as to absorb the impact of the commercial product in front moving on the display shelf by fixing the cylinder to a lower end part of the incline of the display shelf being the base 50.

(2) Other (2-1) Shock absorbing for adjustable angle back of chair
(2-2) Cushion of bed or mattress
(2-3) Shock absorbing for storm door or shutter
(2-4) Shock absorbing for water supply tank or plastic bottle holder of refrigerator (freezer)
(2-5) Shock absorbing for bookshelf, moving rack
(2-6) Vibration absorbing for home electric appliance such as washing machine or dryer
(2-6) Shock absorbing during storage or installation/removal of seat of automobile
(2-7) Shock absorbing seat of automobile
(2-8) Shock absorbing for step-on type parking brake of automobile
(2-9) Shock absorbing during collision of automobile with human
(2-10) Vibration/shock absorbing of tire rack
(2-11) Vibration absorbing for baby carriage
(2-12) Various kinds of detection by attaching a switch to the damper 1

Although this invention has been disclosed with reference to only a limited number of embodiments, it will be self-evident to those skilled in the art which the invention pertains or most closely pertains, when equipped with the preceding disclosure, that various modifications and changes can be made without departing from the scope of the present invention which is limited only by the appended claims.

The disclosure of Japanese Patent Application No. 2004-213528 filed on Jul. 21, 2004 is incorporated herein.

What is claimed is:

1. A combination comprising:
at least one shock absorbing device, a moving body, and a movement restricting part,
wherein said at least at least one shock absorbing device comprises a cylinder enclosing a viscous fluid, a piston rod, a piston slidably situated in the cylinder to divide an interior of the cylinder in two axially separated parts and connected to the piston rod, said piston including an orifice communicating the two parts, an inner member integrally connected with the piston rod, and an outer member disposed about an outer perimeter of the inner member to be axially movable with respect to the inner member, said inner and outer members being arranged to define a gap therebetween through which the viscous fluid can flow so that the gap is reduced as an amount that the inner member protrudes into the outer member increases to thereby form a variable orifice, and a spring disposed between the inner and outer members to urge the inner and outer members away from each other,
said movement restricting part restricts movement of the moving body by contacting with the moving body, one of the cylinder and the piston rod being fixed to the moving body such that the other of the cylinder and the piston rod slightly projects outwardly from the moving body,
said moving body is at least one of a toilet cover and a toilet seat, and said movement restricting part is at least one of a toilet main body and the toilet seat contacting the toilet cover, and
a plurality of said shock absorbing devices is arranged to be spaced apart from each other, and is attached to said at least one of the toilet cover and the toilet seat as the moving body without connecting to the movement restricting part to absorb shocks by rotational movements of the toilet cover and the toilet seat against the movement restricting part.

2. A combination according to claim 1, wherein the orifice is a fixed orifice and is formed in the outer member so as to fluidly communicate with the gap defined between the inner and outer members.

3. A combination according to claim 2, wherein the fixed orifice and the variable orifice are arranged so that the viscous fluid flows sequentially through the orifice and the gap.

4. A combination according to claim 1, wherein said at least one shock absorbing device further comprises a retainer formed at one inner side of the cylinder through which the cylinder rod passes, and an accumulator disposed in the retainer.

5. A combination according to claim 4, wherein said at least one shock absorbing device further comprises a second spring disposed in the cylinder at a side opposite to the retainer to move the piston toward the retainer.

6. A combination comprising:

at least one shock absorbing device, a moving body, and a movement restricting part, wherein said at least at least one shock absorbing device comprises a cylinder enclosing a viscous fluid, a piston rod, a piston slidably situated in the cylinder to divide an interior of the cylinder in two axially separated parts and connected to the piston rod, said piston including an orifice communicating the two parts, an inner member integrally connected with the piston rod, and an outer member disposed about an outer perimeter of the inner member to be axially movable with respect to the inner member, said inner and outer members being arranged to define a gap therebetween through which the viscous fluid can flow so that the gap is reduced as an amount that the inner member protrudes into the outer member increases to thereby form a variable orifice, and a spring disposed between the inner and outer members to urge the inner and outer members away from each other, said movement restricting part restricts movement of the moving body by contacting with the moving body, one of the cylinder and the piston rod being fixed to one of the moving body and the movement restricting part such that the other of the cylinder and the piston rod slightly projects outwardly therefrom without connecting to the other of the moving body and the movement restricting part, said moving body is a drawer, said movement restricting part is a housing with an opening for receiving the drawer, and said at least one shock absorbing device is attached to the housing to absorb shock by movement of the drawer.

7. A combination according to claim 6, wherein said drawer has projecting parts projecting laterally outwardly from the opening, and the housing has two ends outside the opening, one shock absorbing device being installed at each of the two ends to face outwardly to contact each of the projecting parts.

8. A combination according to claim 7, wherein another shocking absorbing device is installed at each of the two ends to face inwardly of the housing to contact stoppers of a back board of the drawer.

9. A combination comprising:

at least one shock absorbing device, a moving body, and a movement restricting part, wherein said at least at least one shock absorbing device comprises a cylinder enclosing a viscous fluid, a piston rod, a piston slidably situated in the cylinder to divide an interior of the cylinder in two axially separated parts and connected to the piston rod, said piston including an orifice communicating the two parts, an inner member integrally connected with the piston rod, and an outer member disposed about an outer perimeter of the inner member to be axially movable with respect to the inner member, said inner and outer members being arranged to define a gap therebetween through which the viscous fluid can flow so that the gap is reduced as an amount that the inner member protrudes into the outer member increases to thereby form a variable orifice, and a spring disposed between the inner and outer members to urge the inner and outer members away from each other, said movement restricting part restricts movement of the moving body by contacting with the moving body, one of the cylinder and the piston rod being fixed to one of the moving body and the movement restricting part such that the other of the cylinder and the piston rod slightly projects outwardly therefrom, said movement restricting part is a frame, the moving body is a sliding window, and said at least one shock absorbing device is attached to the frame without connecting to the sliding window to absorb shock by movement of the sliding window.

10. A combination comprising:

at least one shock absorbing device, a moving body, and a movement restricting part, wherein said at least at least one shock absorbing device comprises a cylinder enclosing a viscous fluid, a piston rod, a piston slidably situated in the cylinder to divide an interior of the cylinder in two axially separated parts and connected to the piston rod, said piston including an orifice communicating the two parts, an inner member integrally connected with the piston rod, and an outer member disposed about an outer perimeter of the inner member to be axially movable with respect to the inner member, said inner and outer members being arranged to define a gap therebetween through which the viscous fluid can flow so that the gap is reduced as an amount that the inner member protrudes into the outer member increases to thereby form a variable orifice, and a spring disposed between the inner and outer members to urge the inner and outer members away from each other, said movement restricting part restricts movement of the moving body by contacting with the moving body, one of the cylinder and the piston rod being fixed to one of the moving body and the movement restricting part such that the other of the cylinder and the piston rod slightly projects outwardly therefrom, said movement restricting part is a frame, said moving body comprises folding doors, and said at least one shock absorbing device is attached to one of the folding doors without connecting to an abutting part thereto to absorb shock by movement of the folding doors.

\* \* \* \* \*